(12) United States Patent
Takeuchi et al.

(10) Patent No.: US 7,415,091 B2
(45) Date of Patent: Aug. 19, 2008

(54) MULTIPLE FRAME RATE SYNCHRONOUS DETECTING METHOD AND APPARATUS

(75) Inventors: Osamu Takeuchi, Kawasaki (JP); Hiroyuki Ohgaki, Kawasaki (JP); Hideaki Arao, Kawasaki (JP); Masaki Nakada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 10/123,687

(22) Filed: Apr. 16, 2002

(65) Prior Publication Data
US 2003/0081710 A1   May 1, 2003

(30) Foreign Application Priority Data
Oct. 31, 2001   (JP)   .............. 2001-335415

(51) Int. Cl.
*H04L 7/00* (2006.01)
(52) U.S. Cl. .................................... 375/368
(58) Field of Classification Search ............... 375/368, 375/365, 366, 377; 398/154, 155; 370/350, 370/509, 503, 507, 510, 512, 513, 514
See application file for complete search history.

(56) References Cited
U.S. PATENT DOCUMENTS
6,097,735 A * 8/2000 Nemoto ................. 370/476
6,262,594 B1 * 7/2001 Cheung et al. ............ 326/38
6,385,213 B1 * 5/2002 Nakamura et al. ........ 370/513
6,728,492 B1 * 4/2004 Baroncelli ............... 398/154
6,804,248 B1 * 10/2004 Tomar et al. ............ 370/401
6,804,316 B1 * 10/2004 Shectman ............... 375/368
2002/0154647 A1 * 10/2002 Potash ................... 370/412

* cited by examiner

*Primary Examiner*—Sam K Ahn
(74) *Attorney, Agent, or Firm*—Katten Muchin Rosenman LLP

(57) ABSTRACT

A multiple frame rate synchronous detecting apparatus for synchronous-detecting received serial data having one frame rate among a plurality of predetermined frame rates is provided. The apparatus comprises a serial-to-parallel converter for serial-to-parallel converting the received serial data with matching with highest frame rate, a coincidence detector for comparing a portion of the converted parallel data corresponding to a predetermined region defined based on the frame rate, with a pattern for synchronous detection to detect coincidence, and a synchronous determiner for determining to have been synchronized with the frame rate when a periodic cycle of the coincidence detection is the same as a previous one.

36 Claims, 15 Drawing Sheets

FIG.6

| | 1 | 2 | | | | 21 | 22 | 23 | 24 | 25 | 26 | 27 | 28 | | | |
|---|---|---|---|---|---|---|---|---|---|---|---|---|---|---|---|---|
| 1 | #1-1 | #1-5 | | | | #11-1 | #11-5 | #12-1 | #12-5 | #1-1 | #1-5 | #2-1 | #2-5 | | #1-1 | #1-5 |
| 2 | | | | | | | | | | | | | | | | |
| 3 | | | | | | | | | | | | | | | | |
| 4 | | | | | | | | | | | | | | | | |
| 5 | #1-2 | #1-6 | | | | #11-2 | #11-6 | #12-2 | #12-6 | #1-2 | #1-6 | #2-2 | #2-6 | | #1-2 | #1-6 |
| 6 | | | | | | | | | | | | | | | | |
| 7 | | | | | | | | | | | | | | | | |
| 8 | | | | | | | | | | | | | | | | |
| 9 | #1-3 | #1-7 | | | | #11-3 | #11-7 | #12-3 | #12-7 | #1-3 | #1-7 | #2-3 | #2-7 | | #1-3 | #1-7 |
| 10 | | | | | | | | | | | | | | | | |
| 11 | | | | | | | | | | | | | | | | |
| 12 | | | | | | | | | | | | | | | | |
| 13 | #1-4 | #1-8 | | | | #11-4 | #11-8 | #12-4 | #12-8 | #1-4 | #1-8 | #2-4 | #2-8 | | #1-4 | #1-8 |
| 14 | | | | | | | | | | | | | | | | |
| 15 | | | | | | | | | | | | | | | | |
| 16 | | | | | | | | | | | | | | | | |
| | | | A1 BITES | | | | | | | A2 BITES | | | | | A1 | |

FIG.11

(A) CASE0

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | #47-1 | #47-2 | #47-3 | #47-4 | #47-5 | #47-6 | #47-7 | #47-8 | #48-1 | #48-2 | #48-3 | #48-4 | #48-5 | #48-6 | #48-7 | #48-8 |
| | #1-1 | #1-2 | #1-3 | #1-4 | #1-5 | #1-6 | #1-7 | #1-8 | #2-1 | #2-2 | #2-3 | #2-4 | #2-5 | #2-6 | #2-7 | #2-8 |

(B) CASE1

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | #48-8 | #47-1 | #47-2 | #47-3 | #47-4 | #47-5 | #47-6 | #47-7 | #47-8 | #48-1 | #48-2 | #48-3 | #48-4 | #48-5 | #48-6 | #48-7 |
| | #2-8 | #1-1 | #1-2 | #1-3 | #1-4 | #1-5 | #1-6 | #1-7 | #1-8 | #2-1 | #2-2 | #2-3 | #2-4 | #2-5 | #2-6 | #2-7 |

⋮

(C) CASE15

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | #47-2 | #47-3 | #47-4 | #47-5 | #47-6 | #47-7 | #47-8 | #48-1 | #48-2 | #48-3 | #48-4 | #48-5 | #48-6 | #48-7 | #48-8 | #47-1 |
| | #1-2 | #1-3 | #1-4 | #1-5 | #1-6 | #1-7 | #1-8 | #2-1 | #2-2 | #2-3 | #2-4 | #2-5 | #2-6 | #2-7 | #2-8 | #1-1 |

FIG.12

| CASE# | BIT-SHIFTING LENGTH | SELBINARY VALUE |
|---|---|---|
| CASE0 | 0 bit | 0000 |
| CASE1 | 1 bit | 0001 |
| CASE2 | 2 bit | 0010 |
| CASE3 | 3 bit | 0011 |
| CASE4 | 4 bit | 0100 |
| CASE5 | 5 bit | 0101 |
| CASE6 | 6 bit | 0110 |
| CASE7 | 7 bit | 0111 |
| CASE8 | 8 bit | 1000 |
| CASE9 | 9 bit | 1001 |
| CASE10 | 10 bit | 1010 |
| CASE11 | 11 bit | 1011 |
| CASE12 | 12 bit | 1100 |
| CASE13 | 13 bit | 1101 |
| CASE14 | 14 bit | 1110 |
| CASE15 | 15 bit | 1111 |

MULTIPLE FRAME RATE SYNCHRONOUS DETECTING METHOD AND APPARATUS

BACKGROUND OF THE INVENTION

1. Field of the Invention

The present invention generally relates to multiple frame rate synchronous detecting methods and apparatuses and more particularly, to multiple frame rate synchronous detecting method and apparatus which receives and synchronous-detects data having any one frame rate among a plurality of predetermined frame rates.

2. Description of the Related Art

In SONET (Synchronous Optical Network) system used in North America, Taiwan, Hong Kong, and SDH (Synchronous Digital Hierarchy) used in other countries, multiple frame rates are defined.

SONET system adopts three synchronous transmission modules shown in FIG. 1. The first one is a synchronous transmission module STS-48 (communication speed of 2.48832 Gbps, about 2.4 Gbps) having a frame format shown in FIG. 1(A). The second one is a synchronous transmission module STS-12 (communication speed of 622.08 Mbps, about 622 Mbps) having a frame format shown in FIG. 1(B). The third one is a synchronous transmission module STS-3 (communication speed of 155.52 Mbps, about 156 Mbps) having a frame format shown in FIG. 1(C).

The STS-48 frame comprises SOH (Section OverHead) of 9 rows×144 columns and pay-load of 9 rows×4176 columns. A1 and A2 bytes each having 48 bytes on the first row are frame synchronous signals. Among these bytes, the last two bytes (#47, #48) in the A1 bytes and the first two bytes (#49, #50) in the A2 bytes have a fixed frame detection pattern of 0xF6F62828 (0x represents hexadecimal notation).

The STS-12 frame comprises SOH (Section OverHead) of 9 rows×36 columns and pay-load of 9 rows×1044 columns. A1 and A2 bytes each having 12 bytes on the first row are frame synchronous signals. Among these bytes, the last two bytes (#11, #12) in the A1 bytes and the first two bytes (#13, #144) in the A2 bytes have the fixed frame detection pattern of 0xF6F62828 (0x represents hexadecimal notation).

The STS-3 frame comprises SOH (Section OverHead) of 9 rows×9 columns and pay-load of 9 rows×261 columns. A1 and A2 bytes each having 3 bytes on the first row are frame synchronous signals. Among these bytes, the last two bytes (#2, #3) in the A1 bytes and the first two bytes (#4, #5) in the A2 bytes have the fixed frame detection pattern of 0xF6F62828 (0x represents hexadecimal notation).

FIG. 2 shows a block diagram of a frame synchronous detecting apparatus in the prior art. An O/E module 10 receives an optical signal having a single frame rate, converts it to an electrical signal and outputs serially. Frame data (fixed rate at iMbps) outputted from this O/E module 10 is supplied to a serial/parallel converting circuit (S/P) 12 having a ratio of 1:2, and converted there to an n-bit parallel signal (fixed rate at i/n Mbps×n) and supplied to a synchronous detection circuit 14.

The synchronous detection circuit 14 keeps in store a 32 bit fixed pattern (0xF6F62828) for synchronous detection of section overhead A1 bytes and A2 bytes in the synchronous transmission module, and compares the stored pattern with a bit sequence received in parallel to detect the frame pattern. When the synchronous detection circuit 14 detects the frame pattern, it outputs data sequence and a frame detection signal (SEL). A barrel shift part 16 receives and shifts the data sequence in response to an input time of the frame detection signal to output data sequence as shown in FIGS. 1(A), 1(B) and 1(C) and a frame pulse (FP).

In the prior art apparatus for handling data having multiple frame rates, different synchronous detection circuits are provided for processing different frame rates, and an adequate synchronous detection circuit is selected to be used depending on a frame rate of received data.

FIG. 3 shows a block diagram of one example of such prior multiple frame rate synchronous detection apparatuses. An O/E module 20 converts a frame data of a received optical signal to an electrical signal and outputs it serially. A control circuit 21 receives the frame data signal and directs it to one of serial/parallel converting circuits 22A, 22B and 22C. The control circuit 21 directs the frame data signal to the serial/parallel converting circuit 22A when the control signal indicates STS-48. The control circuit 21 directs the frame data signal to the serial/parallel converting circuit 22B when the control signal indicates STS-12. The control circuit 21 directs the frame data signal to the serial/parallel converting circuit 22C when the control signal indicates STS-3.

The serial/parallel converting circuit 22A converts 2.4 Gbps frame data to n-bit parallel data in synchronism with a clock of 2.4 GHz frequency, and supplied the converted parallel data to a synchronous detection circuit 24A. The serial/parallel converting circuit 22B converts 622 Mbps frame data to n-bit parallel data in synchronism with a clock of 622 MHz frequency, and supplied the converted parallel data to a synchronous detection circuit 24B. The serial/parallel converting circuit 22C converts 156 Mbps frame data to n-bit parallel data in synchronism with a clock of 156 MHz frequency, and supplied the converted parallel data to a synchronous detection circuit 24C.

Each of the synchronous detection circuits 24A, 24B and 24C keeps a 32-bit synchronous detection pattern (0xF6F62828) in store, compares the stored pattern with the bit sequence received in parallel to detect the frame pattern, and outputs a data sequence (data) and a frame detection signal (SEL).

In this manner, the prior art multiple frame rate synchronous detection apparatuses had to be equipped with a plurality of serial/parallel converting circuits having different speeds and a plurality of synchronous detection circuits for processing different frame rates, and therefore resulted in large circuit sizes.

SUMMARY OF THE INVENTION

The previously mentioned disadvantages are overcome and other advantages achieved with the present invention. According to one feature of the present invention, multiple frame rate synchronous detecting method and apparatus are provided, which can synchronous-detect a plurality of frame rates with using a single detection circuit.

In one form, the present invention comprises a multiple frame rate synchronous detecting method of synchronous-detecting received serial data having one frame rate among a plurality of predetermined frame rates. This method comprises the steps of serial-to-parallel converting the received serial data with matching with highest frame rate; comparing a portion of the converted parallel data corresponding to a predetermined region defined based on the frame rate, with a pattern for synchronous detection to detect coincidence; and determining to have been synchronized with the frame rate when a periodic cycle of the coincidence detection is the same as a previous one. Thus, a plurality of frame rates can be synchronous-detected by a single circuit having a small circuit size.

In another form, the present invention comprises a multiple frame rate synchronous detecting apparatus for synchronous-detecting received serial data having one frame rate among a plurality of predetermined frame rates. This apparatus comprises a serial-to-parallel converter for serial-to-parallel converting the received serial data with matching with highest frame rate; a coincidence detector for comparing a portion of the converted parallel data corresponding to a predetermined region defined based on the frame rate, with a pattern for synchronous detection to detect coincidence; and a synchronous determiner for determining to have been synchronized with the frame rate when a periodic cycle of the coincidence detection is the same as a previous one. Thus, a plurality of frame rates can be synchronous-detected by a single circuit having a small circuit size.

BRIEF DESCRIPTION OF THE DRAWINGS

FIG. 6 shows an output data format converted from the STS-12 frame;

FIG. 11(A) shows contents of the register 35 (for STS-48) of a case in synchronism;

FIG. 11(B) shows contents of the register 35 (for STS-48) of a case 1 out of synchronism by one bit;

FIG. 11(C) shows contents of the register 35 (for STS-48) of a case 2 out of synchronism by 15 bits;

FIG. 12 is a chart showing case numbers, SEL binary values and bit-shifting lengths necessary for synchronization;

DETAIL DESCRIPTION OF THE PREFERRED EMBODIMENTS

A description will now be given, with reference to the drawings, of embodiments of the present invention.

Figure 4:
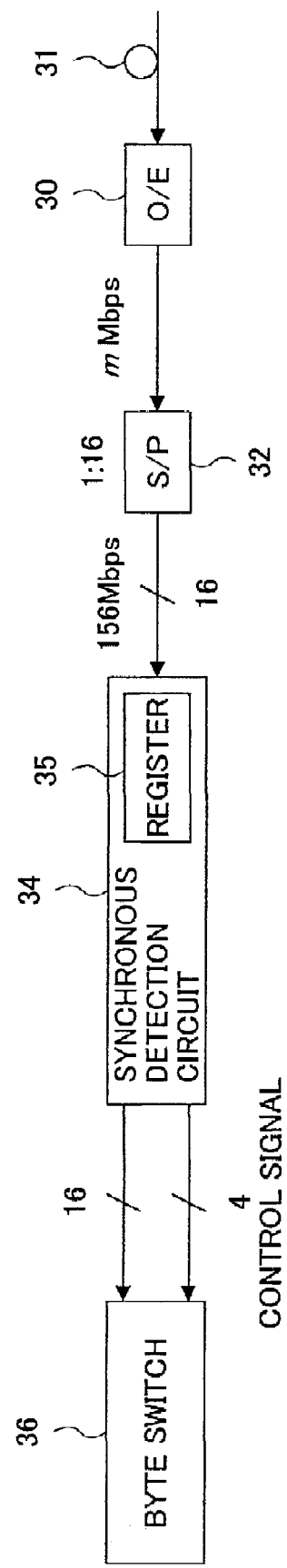
FIG. 4 shows a block diagram of a multiple frame rate synchronous detecting apparatus according to one embodiment of the present invention.

FIG. 4 shows a block diagram of a multiple frame rate synchronous detecting apparatus according to one embodiment of the present invention. An O/E module 30 receives an optical signal from an optical cable 31. The optical signal has any one of a plurality of predetermined frame rates. The O/E module 30 converts frame data of the optical signal to an electrical signal and outputs serially. The frame data sequence at any given bit rate (mMbps) outputted from the O/E module 30 is supplied to a serial/parallel converting circuit (S/P) 32. The frame data sequence is then converted to parallel data using a ratio of 1:16, in synchronism with a clock of 2.4 GHz (accurately 2.488 GHz) matching with the highest frame rate for STS-48. The bit rate of the parallel output is 156 Mbps (accurately 155.52 Mbps).

Figure 1:
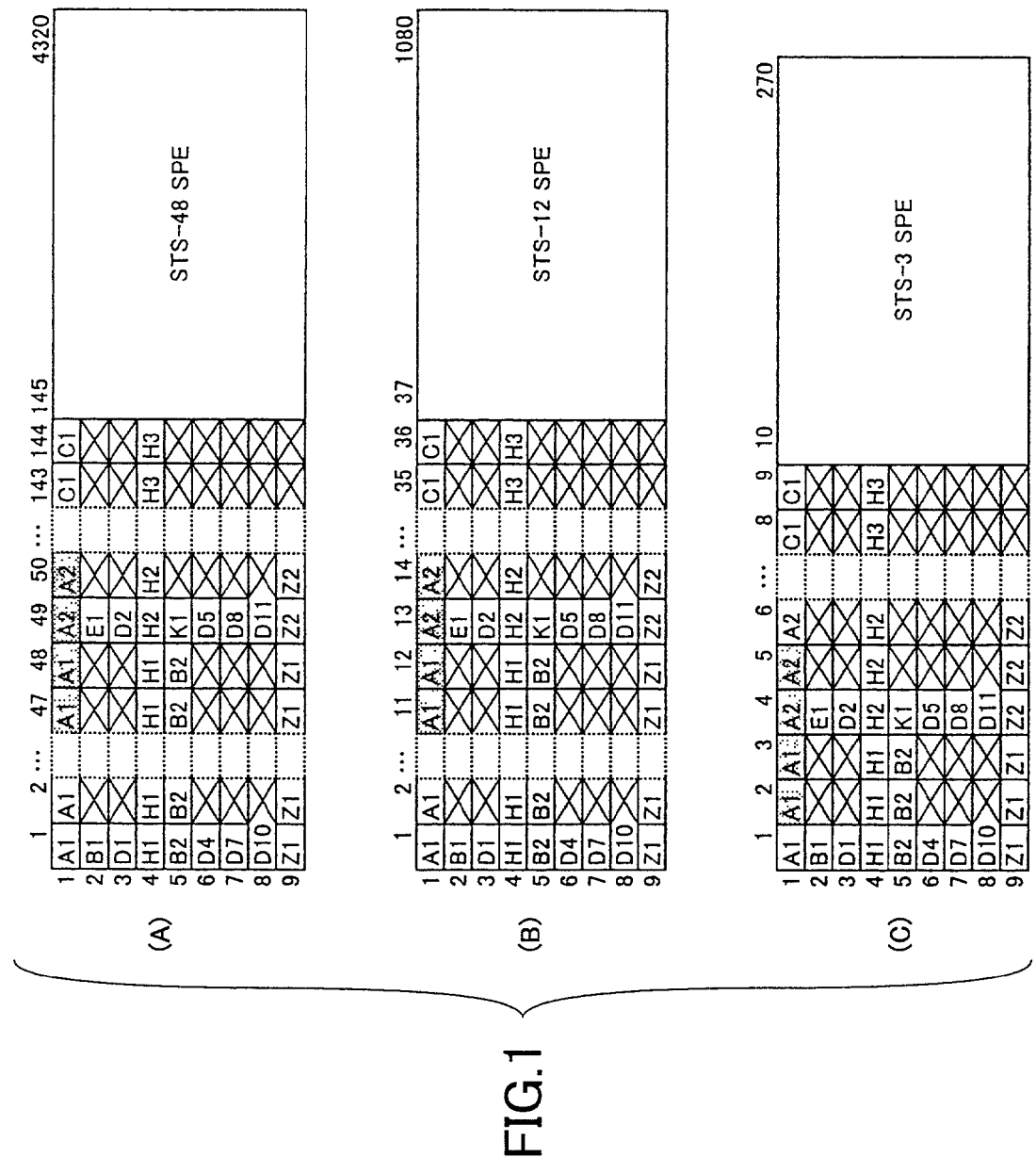
FIG. 1 shows three frame formats adopted by a SONET system.
Figure 2:
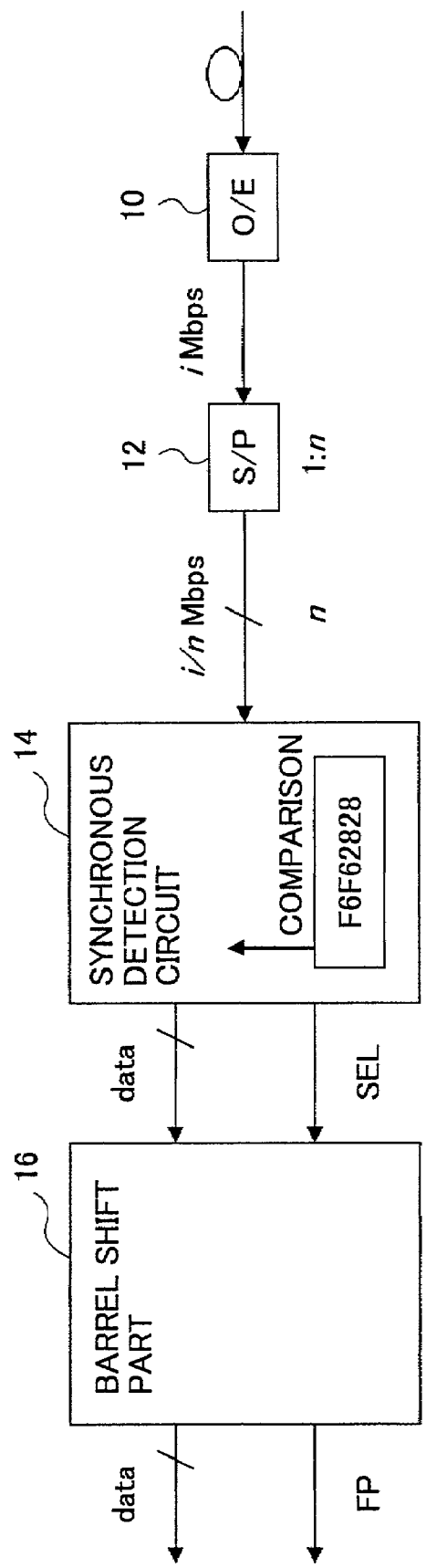
FIG. 2 shows a block diagram of a frame synchronous detecting apparatus in the prior art.
Figure 3:
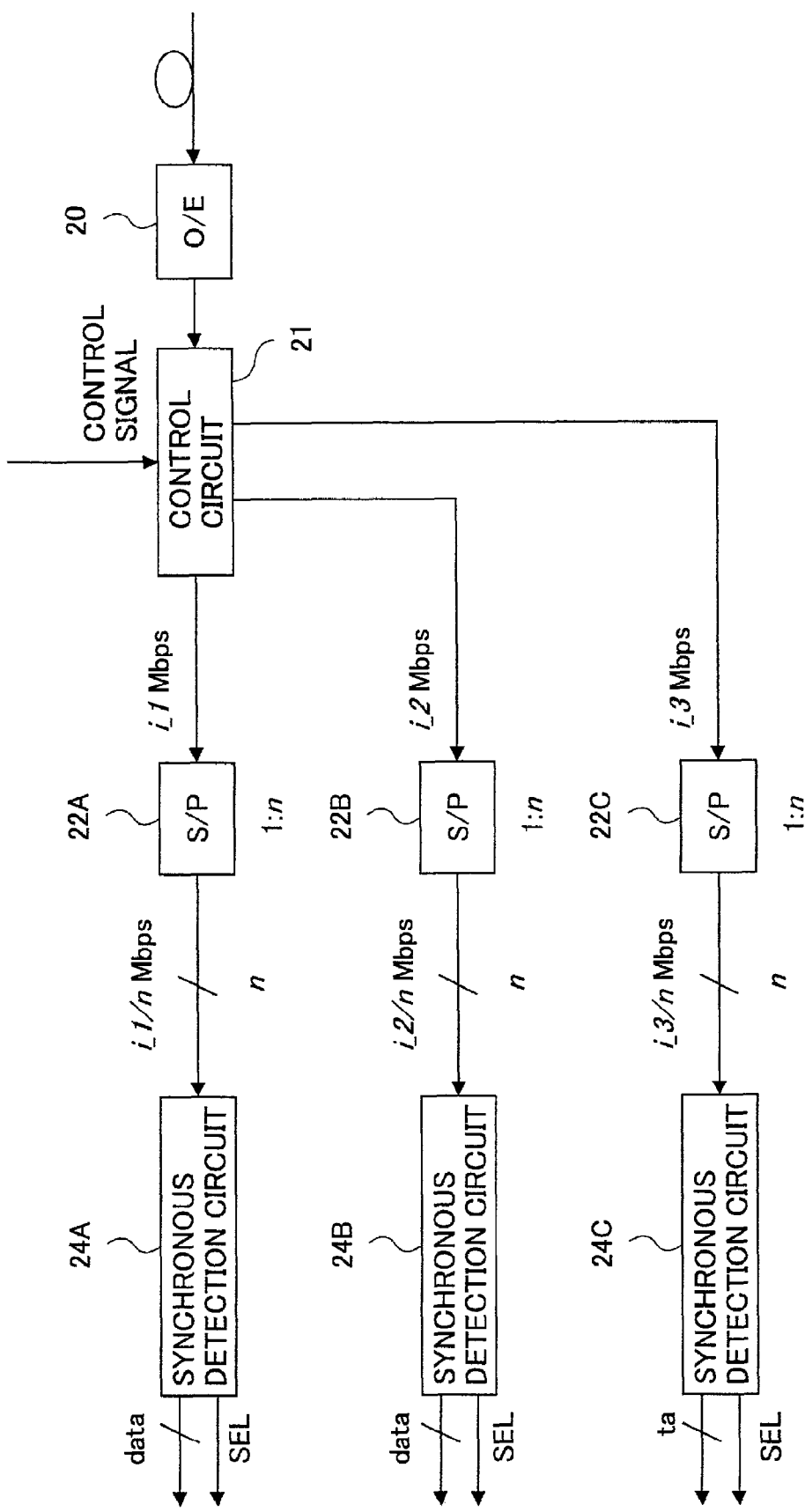
FIG. 3 shows a block diagram of one example of such prior multiple frame rate synchronous detection apparatuses.
Figure 5:
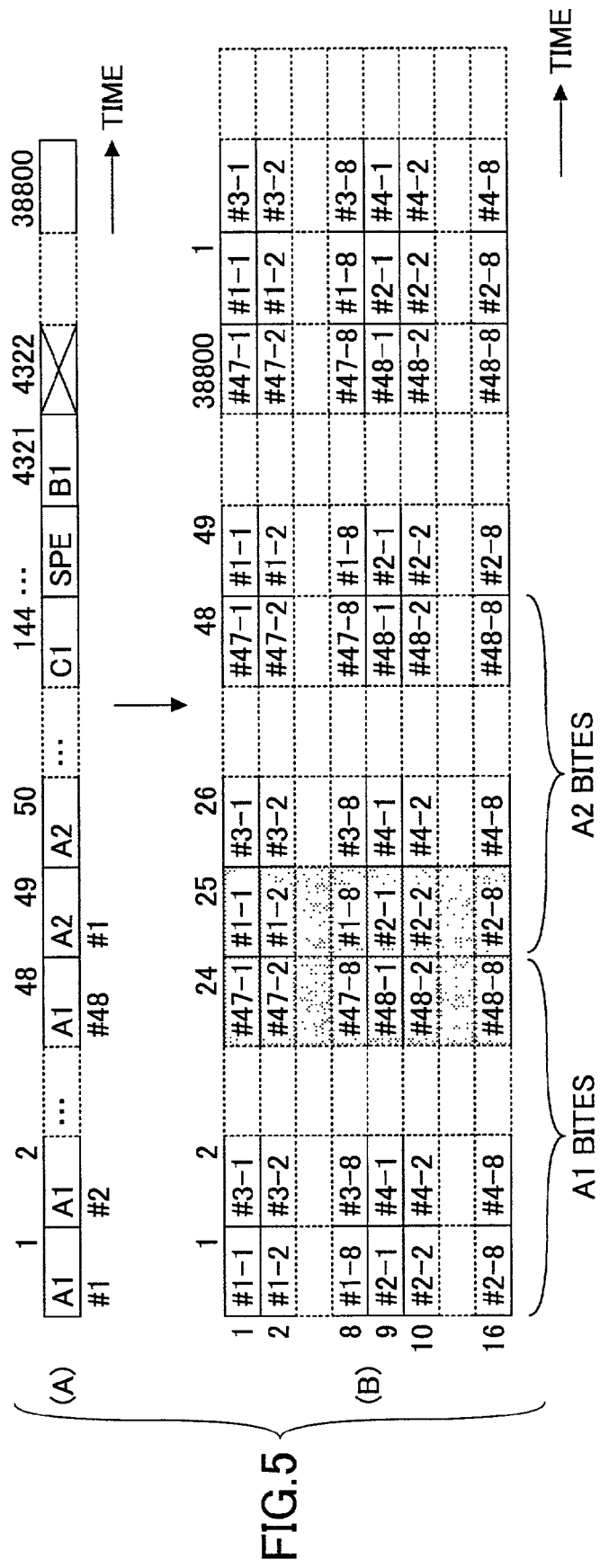
FIG. 5(A) shows a transmission format of the STS-48 frame shown in FIG. 1(A)
FIG. 5(B) shows parallel formatted data converted from the serially formatted data shown in FIG. 5(A)

For example, the STS-48 frame shown in FIG. 1(A) is transmitted in the form shown in FIG. 5(A). Each cell shown in FIG. 5(A) has one byte of data. That is, the #1 cell of A1 has one byte length. The serially formatted data shown in FIG. 5(A) is converted to the format shown in FIG. 5(B). In this example, the MSB (Most Significant Bit) of the A1 byte in the STS-48 frame is outputted in the first channel (row) among 16 channels of the output from the serial/parallel converting circuit 32. Each cell shown in FIG. 5(B) has one bit, and the leftmost column includes two bytes of A1 #1, #2. "#1-1" represents the first bit of the byte #1. Cells in that a synchronous detecting pattern is located are shaded in FIG. 5(B).

In the serial/parallel converting circuit 32, when the input rate is slower than the output rate (156 Mbps), the output data is sparsely extended in the direction of its channel (column) to satisfy the law of causality. Therefore, an output data format converted from the STS-12 frame is as shown in FIG. 6. Each cell shown in FIG. 6 includes four bits. All the four bits in one cell has the same data. Cells in that a synchronous detecting pattern is located are shaded in FIG. 6.

Figure 7:
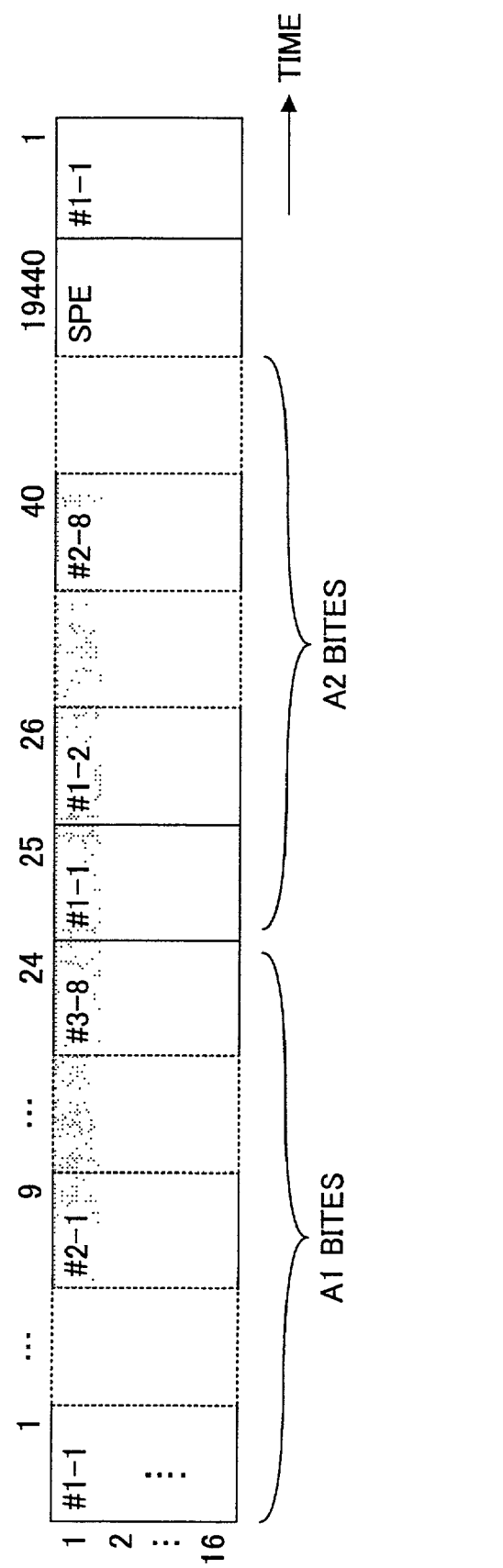
FIG. 7 shows an output data format converted from the STS-3 frame.

An output data format converted from the STS-3 frame is as shown in FIG. 7. Each cell shown in FIG. 7 includes two bytes (16 rows). All the 16 bits in one cell has the same data. Cells in that a synchronous detecting pattern is located are shaded in FIG. 6.

Returning to FIG. 4, the output sequence outputted from the serial/parallel circuit 32 is supplied to the synchronous detection circuit 34. The synchronous detection circuit 34 determines whether its fixed synchronous detecting pattern of 0xF6F62828 matches with the last two bytes of A1 bytes and the last two bytes of A2 bytes included SOH of the data frame.

Figure 8:
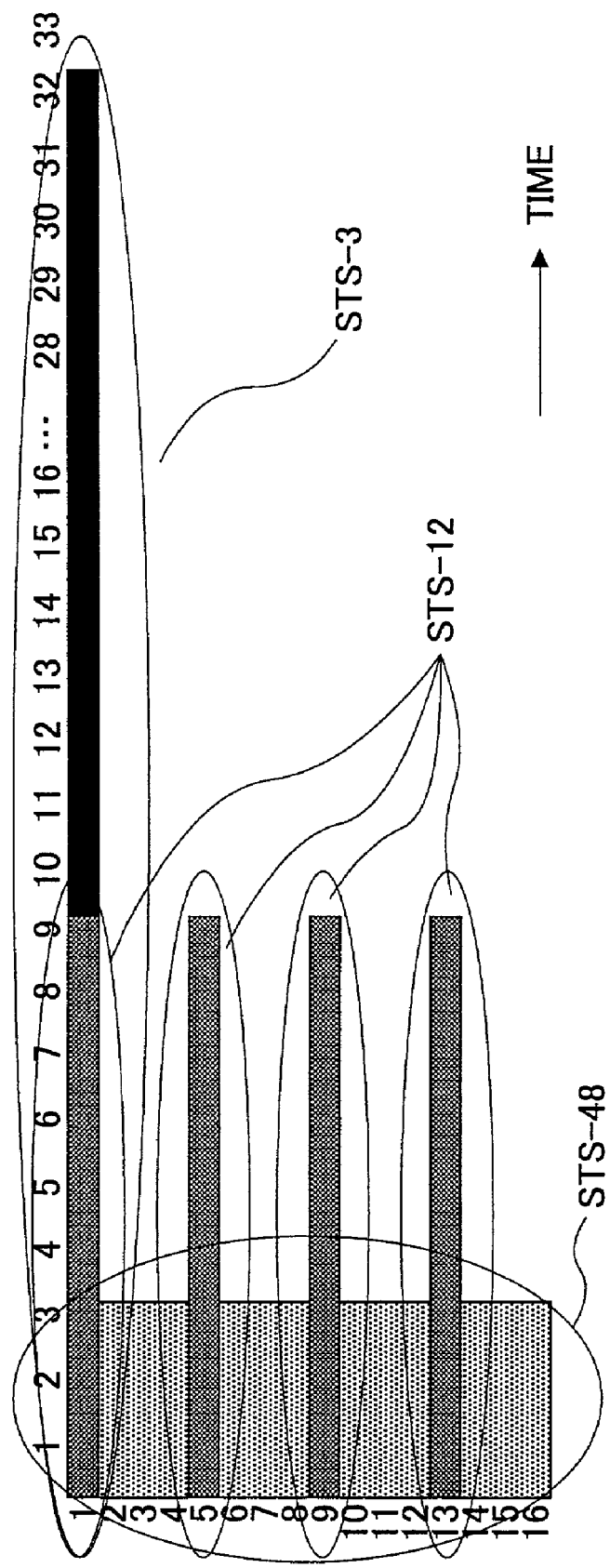
FIG. 8 shows converted frame data detecting pattern portions for three frame data systems.

In the actual comparing procedure for the STS-48 frame, three clocks of 16 channels in the output of the serial/parallel converting circuit 32 as shown in FIG. 8 are compared with the fixed synchronous detecting pattern. In the case of the STS-12 frame, nine clocks of the first, the fifth, the ninth and the thirteenth channels in the output of the serial/parallel converting circuit 32 as shown in FIG. 8 are compared with the fixed synchronous detecting pattern. In the case of the STS-3 frame, 32 clocks of the first channel in the output of the serial/parallel converting circuit 32 as shown in FIG. 8 are compared with the fixed synchronous detecting pattern.

Figure 9:
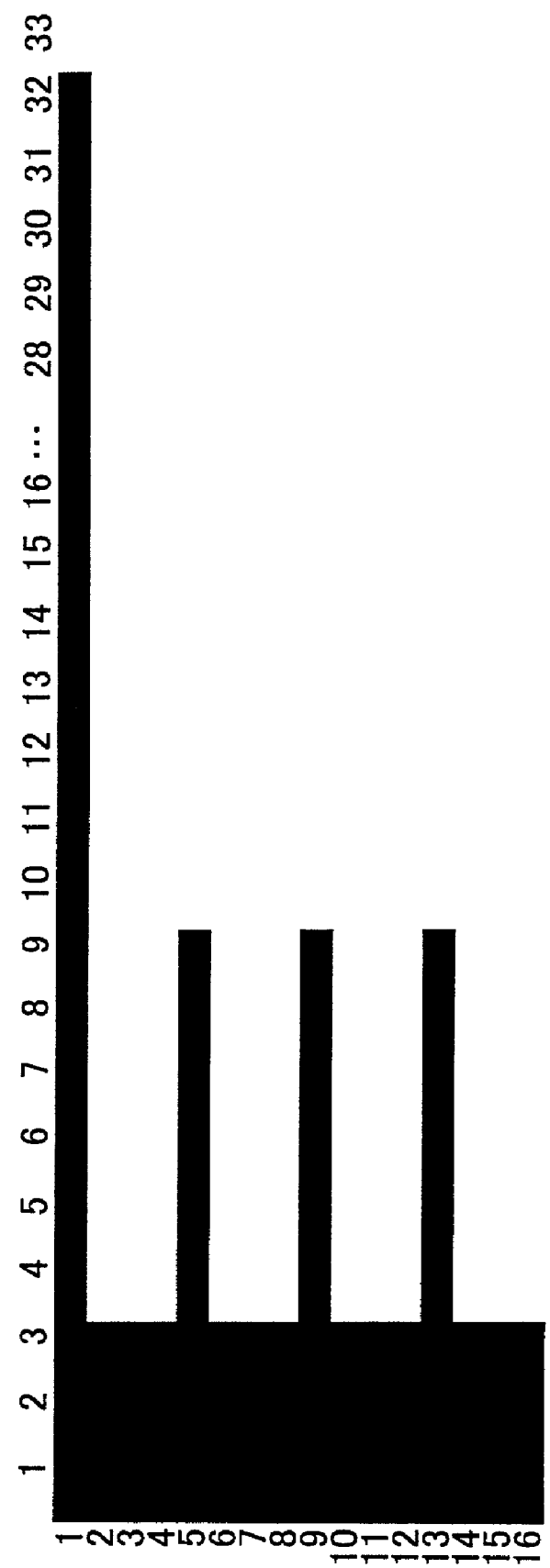
FIG. 9 shows coverage area by register 35, which covers the detecting area for each frame rate.

The synchronous detection circuit 34 is provided with a register 35 that covers the detecting area for each frame rate as shown in FIG. 9. The 16 channel parallel data sequence outputted from the serial/parallel converting circuit 32 is stored in the register 35 for synchronous detection.

Figure 10:
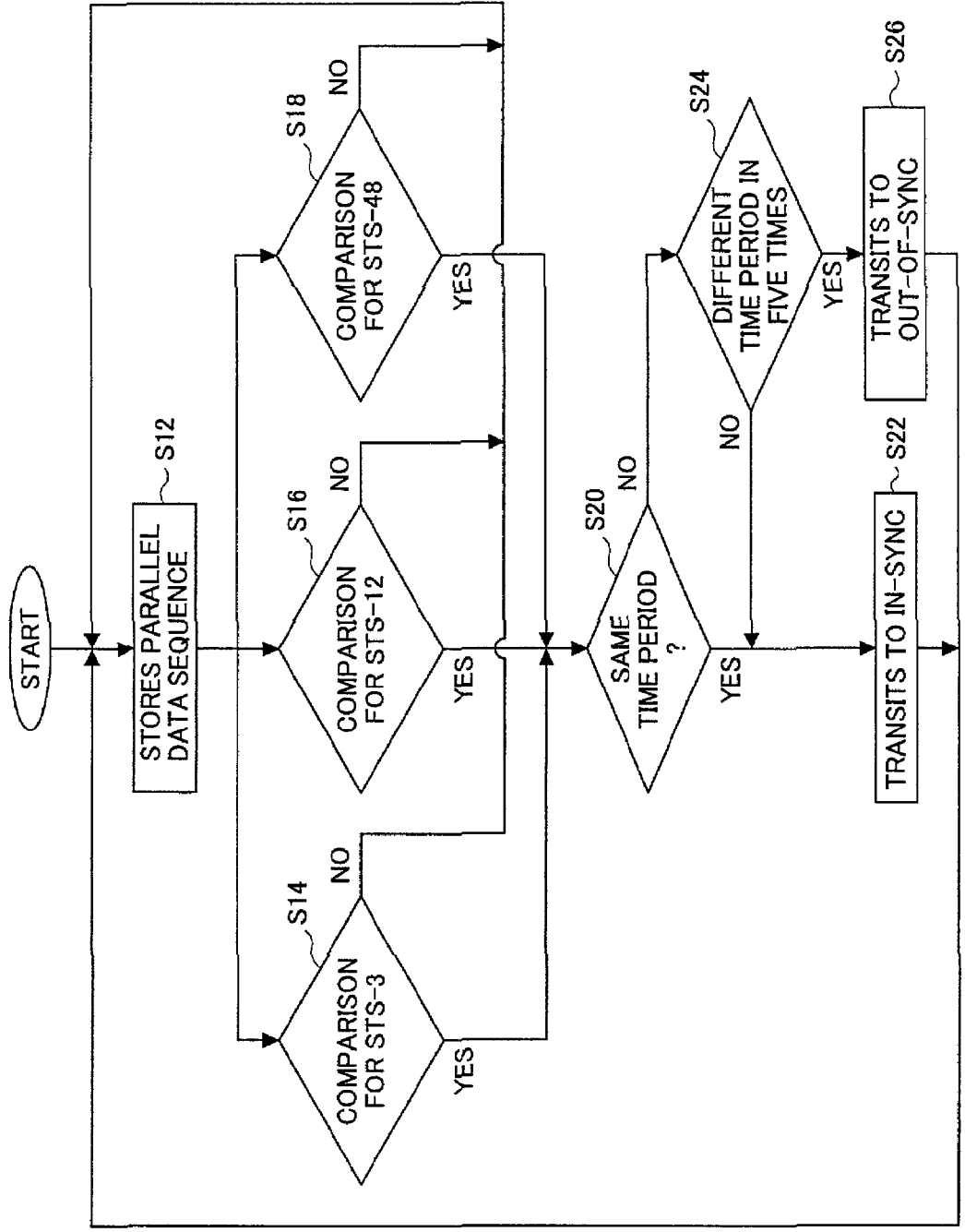
FIG. 10 shows a flow chart illustrating procedure carried out by the synchronous detection circuit 34.

FIG. 10 shows a flow chart illustrating procedure carried out by the synchronous detection circuit 34. Out of synchronism state is set at the starting point of this procedure. At a step S12, parallel data sequence is stored in the register 35. At a step S14, the stored data sequence within the detection area of the STS-3 is compared with the synchronous detecting pattern 0xF6F62828 to determine if they are coincident with each other. At a step S16, the stored data sequence within the detection area of the STS-12 is compared with the synchronous detecting pattern 0xF6F62828 to determine if they are coincident with each other. At a step S18, the stored data sequence within the detection area of the STS-48 is compared with the synchronous detecting pattern 0xF6F62828 to determine if they are coincident with each other. The steps S14, S16 and S18 can be carried out in any order, and can be carried out simultaneously.

If no coincidence occurs, the procedure goes back to the step S12, and repeats the steps 12, 14, 16 and 18. On the other hand, coincidence occurs at any step of the steps 14, 16 and 18, the procedure goes forward to a step 20, and determine there if the coincident occurred after the same time period as in the last detection steps. The same time period means that the time duration from the last coincidence to the present coincidence has the same length as the time duration from the last but one coincidence to the last coincidence.

If it is determined to be the same time period, then the procedure goes to a step 22, where the synchronous detection circuit moves to in-synchronism state and stores the present time period and goes back to the step S12. On the other hand, if it is determined not to be the same time period, the procedure goes to a step S24, determine whether all the time periods are different from the last one in five consecutive detection trials. If all the time periods are different from the last one in five consecutive detection trials, the synchronous detection circuit moves to out-of-synchronism state (S26), stores the present time period and goes back to the step S12. If not, the procedure goes to the step S22, moves to the in-synchronism state, stores the present time period and goes back to the step S12.

In this manner, the synchronous detection circuit 34 having one register and one comparison circuit can detect the rate without receiving any information about frame rates from outside.

Because 16-bit parallel data sequence is used, there exist 16 detecting patterns for each frame except for the STS-3. These 16 patterns can be checked with using prior art technology.

FIG. 11 illustrates three cases of detecting data sequence in the STS-48. FIG. 11(A) shows contents of the register 35 (for STS-48) of a case 0, in which data is stored in synchronism. FIG. 11(B) shows contents of the register 35 (for STS-48) of a case 1, in which data is stored out of synchronism by one bit. In the same manner, FIG. 11(C) shows contents of the register 35 (for STS-48) of a case 2, in which data is stored out of synchronism by 15 bits.

The synchronous detection circuit 34 supplies a 4-bit control signal SEL together with 16-channel parallel data sequence to a byte switch 36. The control signal SEL indicates case number out of 16 cases, case 0-case 15. FIG. 12 is a chart showing case numbers, SEL binary values and bit-shifting lengths necessary for synchronization.

Figure 13:
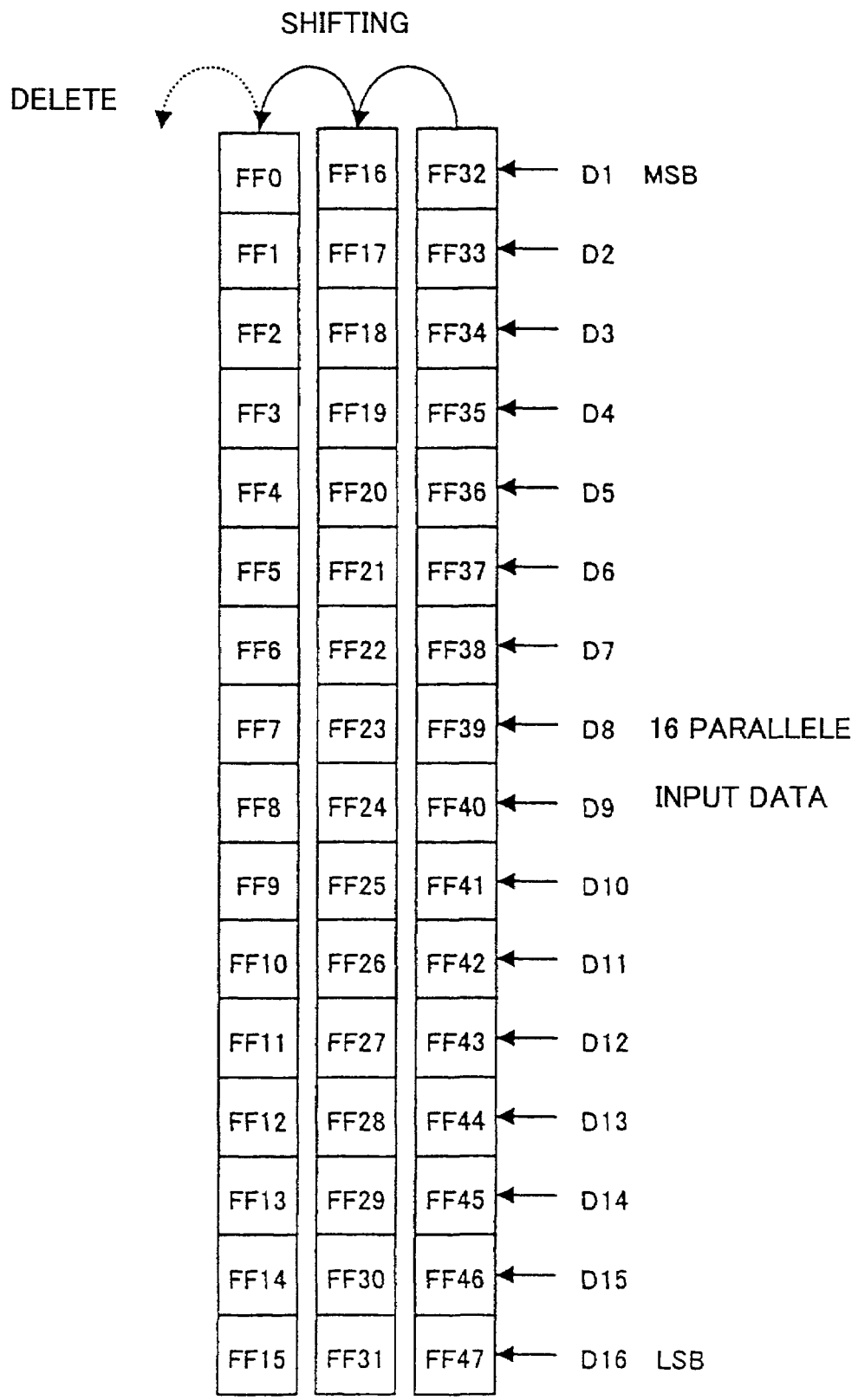
FIG. 13 shows the contents of the register 35 in the case of STS-48.

The operation of the byte switch 36 will be explained below with using an example of STS-48 case. The contents of the register 35 are shown in FIG. 13 in the case of STS-48. Here, each of flip-flops FF0-FF47 stores one bit data. 16-channel data D1-D16 are supplied to and stored in flip-flops FF32-FF47. At the same time, the contents of flip-flops FF32-FF47 are shifted to flip-flops FF16-FF31, and the contents of flip-flops FF16-FF31 are shifted to flip-flops FF0-FF15.

Figure 14:
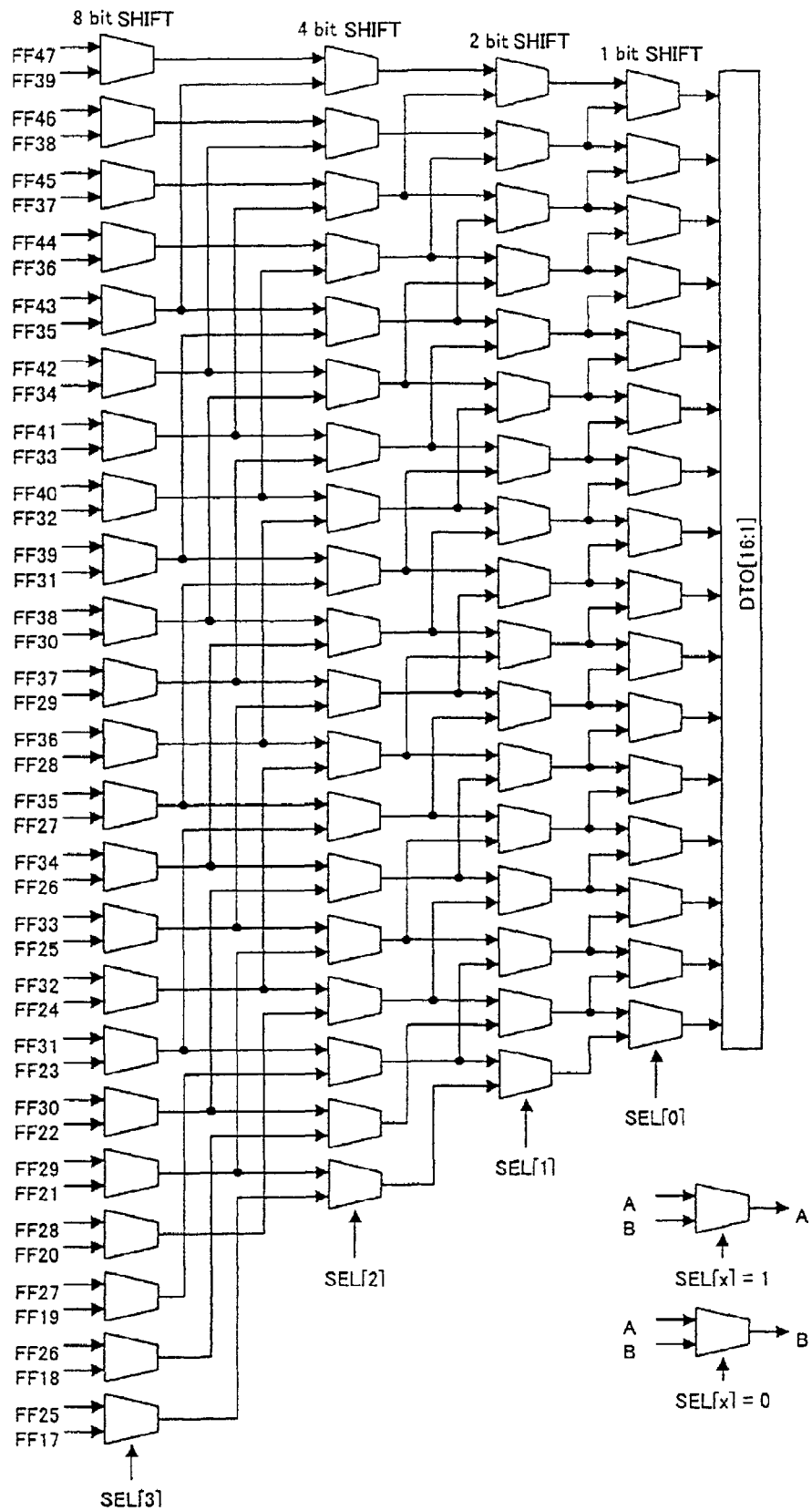
FIG. 14 shows a circuit diagram of one embodiment of the byte switch 36.

FIG. 14 shows a circuit diagram of one embodiment of the byte switch 36. The byte switch 36 includes 23 8-bit shifting selectors that select one of two inputs to perform 8-bit shifting based on the MSB (SEL3) of the control signal (SEL), 19 4-bit shifting selectors that select one of two inputs to perform 4-bit shifting based on the third bit (SEL2) of the control signal (SEL), 17 2-bit shifting selectors that select one of two inputs to perform 2-bit shifting based on the second (SEL1) of the control signal (SEL), and 16 1-bit shifting selectors that select one of two inputs to perform 1-bit shifting based on the MSB (SEL0) of the control signal (SEL).

Figure 15:
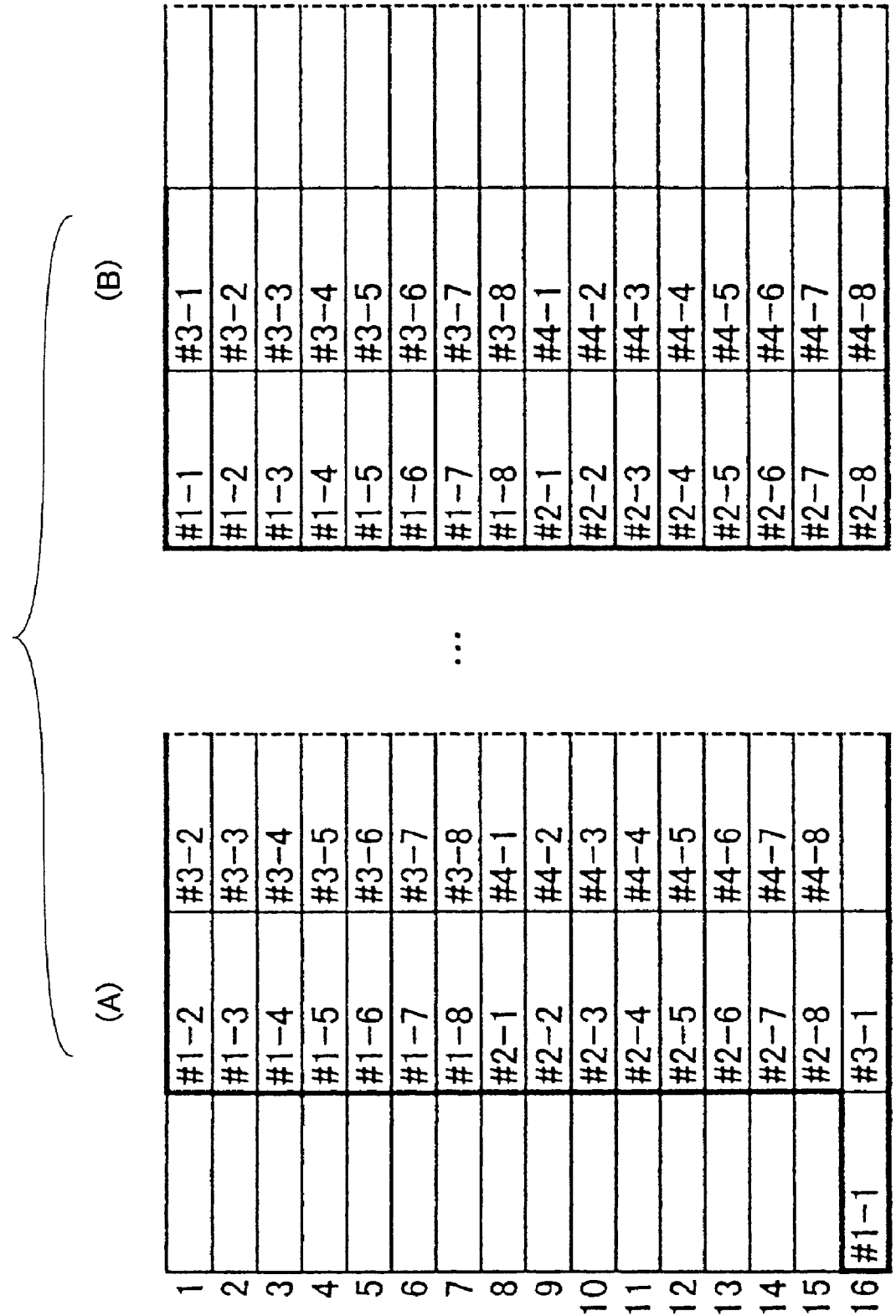
FIG. 15 shows how the byte switch 36 corrects the out-of-synchronism state to get in-synchronism state data.

The byte switch 36 can correct out-of-synchronism state as shown in FIG. 15(A) to output in-synchronism state data shown in FIG. 15(B). In addition to the data output, the byte switch 36 outputs frame pulses that become high at the same time as outputting 16 bits of bytes #1 and #2 as shown in FIG. 15.

According to the embodiments of the present invention, one small apparatus having a serial/parallel converting circuit and one synchronous detection circuit can perform synchronous detection in a multiple frame rate unit. The method and circuits according to the embodiments of the present invention are flexible and can be extended to a variety type of method and circuits for any kind of formats and frame rates.

Although the above embodiments were explained with using SONET, the present invention can be applied to SDH and other systems and is not limited to the embodiments explained herein.

The serial/parallel converting circuit 32 in embodiments is one example of a serial-to-parallel converter in claims. The steps S14, S16 and S18 in the embodiments are examples of a coincidence detector in claims. The step S20 in the embodiments is an example of a synchronous determiner in claims.

As described above, the embodiments of the present invention can significantly reduce the size of synchronous detection circuitry for multiple frame rate data processing.

The present invention is not limited to the embodiments, but various variations and modifications may be made without departing from the scope of the present invention.

This patent application is based on Japanese priority patent application No. 2001-335415 filed on Oct. 31, 2001, the entire contents of which are hereby incorporated by reference.

What is claimed is:

1. A multiple frame rate synchronous detecting method of synchronous-detecting received serial data having one frame rate among a plurality of predetermined frame rates, the method comprising the steps of:
   serial-to-parallel converting the received serial data with matching with highest frame rate into parallel data,
   wherein for a frame rate lower than the highest frame rate the converted parallel data is sparsely extended in the direction of the channel of the converted parallel data, and
   wherein the converted parallel data includes a plurality of different channel-by-clock detecting areas corresponding to the respective plurality of predetermined frame rates;
   comparing a detection area of the sparsely extended converted parallel data corresponding to a predetermined frame rate, with a pattern for synchronous detection to detect coincidence; and
   determining to have been synchronized with the frame rate when a periodic cycle of the coincidence detection is the same as a previous one.

2. The method according to claim 1, wherein the plurality of predetermined frame rates are frame rates for SONET synchronous transmission module STS-48, STS-12 and STS-3.

3. The method according to claim 2, wherein the detection area of the sparsely extended converted parallel data is the last two bytes in A1 bytes and the first two bytes in A2 bytes in section overhead of each synchronous transmission module.

4. The method according to claim 3, wherein the pattern for synchronous detection is F6F62828 in hexadecimal notation.

5. The method according to claim 1, wherein the bit rate of the sparsely extended converted parallel data is 155.52 Mbps.

6. The method according to claim 1, wherein the detection area of the sparsely extended converted parallel data corresponding to a predetermined frame rate comprises a detection area of an STS-3 frame, a detection area of an STS-12 frame, or a detection area of an STS-48 frame.

7. The method according to claim 6, wherein the step of comparing the detection area of the sparsely extended converted parallel data corresponding to a predetermined frame rate comprises:
    comparing the data sequence within the detection area of the STS-3 frame with the pattern for synchronous detection,
    comparing the data sequence within the detection area of the STS-12 frame with the pattern for synchronous detection, and
    comparing the data sequence within the detection area of the STS-48 frame with the pattern for synchronous detection.

8. The method according to claim 1, wherein the steps of comparing and determining are carried out simultaneously.

9. The method according to claim 1, wherein the step of comparing is performed by a single comparator.

10. The method according to claim 1, wherein the step of comparing and the step of determining are performed by a single synchronous detection circuit.

11. A multiple frame rate synchronous detecting apparatus for synchronous-detecting received serial data having one frame rate among a plurality of predetermined frame rates, the apparatus comprising:
    a serial-to-parallel converter serial-to-parallel converting the received serial data with matching with highest frame rate into parallel data,
    wherein for a frame rate lower than the highest frame rate the converted parallel data is sparsely extended in the direction of the channel of the converted parallel data, and
    wherein the converted parallel data includes a plurality of different channel-by-clock detecting areas corresponding to the respective plurality of predetermined frame rates;
    a coincidence detector comparing a detection area of the sparsely extended converted parallel data corresponding to a predetermined frame rate, with a pattern for synchronous detection to detect coincidence; and
    a synchronous determiner determining to have been synchronized with the frame rate when a periodic cycle of the coincidence detection is the same as a previous one.

12. The multiple frame rate synchronous detecting apparatus according to claim 11, wherein the plurality of predetermined frame rates are frame rates for SONET synchronous transmission module STS-48, STS-12 AND STS-3.

13. The multiple frame rate synchronous detecting apparatus according to claim 12, wherein the detection area of the sparsely extended converted parallel data is the last two bytes in A1 bytes and the first two bytes in A2 bytes in section overhead of each synchronous transmission module.

14. The multiple frame rate synchronous detecting apparatus according to claim 13, wherein the pattern for synchronous detection is F6F62828 in hexadecimal notation.

15. The multiple frame rate synchronous detection apparatus according to claim 11, wherein the bit rate of the sparsely extended converted parallel data is 155.52 Mbps.

16. The multiple frame rate synchronous detection apparatus according to claim 11, wherein the detection area of the sparsely extended converted parallel data corresponding to a predetermined frame rate comprises a detection area of an STS-3 frame, a detection area of an STS-12 frame, or a detection area of an STS-48 frame.

17. The multiple frame rate synchronous detection apparatus according to claim 16, wherein the coincidence detector, in comparing the detection area of the sparsely extended converted parallel data corresponding to a predetermined frame rate, is configured to:
    compare the data sequence within the detection area of the STS-3 frame with the pattern for synchronous detection,
    compare the data sequence within the detection area of the STS-12 frame with the pattern for synchronous detection, and
    compare the data sequence within the detection area of the STS-48 frame with the pattern for synchronous detection.

18. The multiple frame rate synchronous detection apparatus according to claim 11, wherein the coincidence detector is configured to carry out the steps of comparing and determining simultaneously.

19. The multiple frame rate synchronous detecting apparatus according to claim 11, wherein the coincidence detector includes a single comparator for comparing the detection area of the sparsely extended converted parallel data corresponding to the predetermined frame rate, with the pattern for synchronous detection to detect coincidence.

20. The multiple frame rate synchronous detection apparatus according to claim 11, wherein the coincidence detector and synchronous determiner form part of a single synchronous detection circuit.

21. A multiple frame rate synchronous detecting method of synchronous-detecting received serial data having one frame rate among a plurality of predetermined frame rates, the method comprising the steps of:
    serial-to-parallel converting the received serial data with matching with highest frame rate into parallel data having a 16-bit sequence;
    comparing a portion of the converted parallel data corresponding to a predetermined region defined based on the frame rate, with a pattern for synchronous detection to detect coincidence; and
    determining to have been synchronized with the frame rate when a periodic cycle of the coincidence detection is the same as a previous one,
    wherein the portion of the converted parallel data corresponding to a predetermined region defined based on the frame rate comprises a detection area of an STS-3 frame, a detection area of an STS-12 frame, or a detection area of an STS-48 frame, and
    wherein the detection area of the STS-3 frame comprises 32 clocks of the first channel in the converted parallel data sequence, the detection area of the STS-12 frame comprises nine clocks of the first, the fifth, the ninth and the thirteenth channels in the converted parallel data sequence, and the detection area of the STS-48 frame comprises three clocks of 16 channels in the converted parallel data sequence.

22. A multiple frame rate synchronous detecting apparatus for synchronous-detecting received serial data having one frame rate among a plurality of predetermined frame rates, the apparatus comprising:
    a serial-to-parallel converter for serial-to-parallel converting the received serial data with matching with highest frame rate into parallel data having a 16-bit sequence;
    a coincidence detector for comparing a portion of the converted parallel data corresponding to a predetermined region defined based on the frame rate, with a pattern for synchronous detection to detect coincidence; and a synchronous determiner for determining to have been synchronized with the frame rate when a periodic cycle of the coincidence detection is the same as a previous one, wherein the portion of the converted parallel data corresponding to a predetermined region defined based on the frame rate comprises a detection area of an STS-3 frame, a detection area of an STS-12 frame, or a detection area of an STS-48 frame, and wherein the detection area of the STS-3 frame comprises 32 clocks of the first channel in the converted parallel data sequence, the detection area of the STS-12 frame comprises nine clocks of the first, the fifth, the ninth and the thirteenth channels in the converted parallel data sequence, and the detection area of the STS-48 frame comprises three clocks of 16 channels in the converted parallel data sequence.

23. A multiple frame rate synchronous detecting method of synchronous-detecting received serial data having one frame rate among first and second predetermined frame rates, the method comprising the steps of:

serial-to-parallel converting the received serial data with matching with highest frame rate into parallel data, which converted parallel data includes first and second portions corresponding to first and second predetermined regions defined based on the respective first and second predetermined frame rates;

comparing the first portion of the converted parallel data with a pattern for synchronous detection to detect coincidence between the first portion and the synchronous detection pattern, and, if there is no coincidence detection between the first portion and the synchronous detection pattern, comparing the second portion of the converted parallel data with the pattern for synchronous detection to detect coincidence between the second portion of the converted parallel data and the synchronous detection pattern, and repeating the comparison steps until a coincidence detection occurs; and determining to have been synchronized with the frame rate when a periodic cycle of the coincidence detection is the same as a previous one.

24. The method according to claim 23, wherein the first and second portions each comprise a predetermined number of clocks and a predetermined number of channels in the converted parallel data.

25. The method according to claim 23, wherein the comparison of the second portion occurs before the comparison of the first portion.

26. The method according to claim 23, wherein the comparison of the first portion and the comparison of the second portion are carried out simultaneously.

27. The method according to claim 23, wherein the first portion comprises a detection area of an STS-3 frame, and the second portion comprises a detection area of an STS-12 frame.

28. The method according to claim 23, wherein the first portion comprises a detection area of an STS-12 frame, and the second portion comprises a detection area of an STS-48 frame.

29. The method according to claim 23, wherein the first portion comprises a detection area of an STS-3 frame, and the second portion comprises a detection area of an STS-48 frame.

30. A multiple frame rate synchronous detecting apparatus of synchronous-detecting received serial data having one frame rate among first and second predetermined frame rates, the apparatus comprising:

a serial-to-parallel converter for serial-to-parallel converting the received serial data with matching with highest frame rate into parallel data, which converted parallel data includes first and second portions corresponding to first and second predetermined regions defined based on the respective first and second predetermined frame rates;

a coincidence detector for comparing the first portion of the converted parallel data with a pattern for synchronous detection to detect coincidence between the first portion and the synchronous detection pattern, and, if there is no coincidence detection between the first portion and the synchronous detection pattern, comparing the second portion of the converted parallel data with the pattern for synchronous detection to detect coincidence between the second portion of the converted parallel data and the synchronous detection pattern, and repeating the comparison steps until a coincidence detection occurs; and a synchronous determiner for determining to have been synchronized with the frame rate when a periodic cycle of the coincidence detection is the same as a previous one.

31. The multiple frame rate synchronous detecting apparatus according to claim 30, wherein the first and second portions each comprise a predetermined number of clocks and a predetermined number of channels in the converted parallel data.

32. The multiple frame rate synchronous detecting apparatus according to claim 30, wherein the coincidence detector is configured to compare the second portion before comparing the first portion.

33. The multiple frame rate synchronous detecting apparatus according to claim 30, wherein the coincidence detector is configured to compare the first portion and the second portion simultaneously.

34. The multiple frame rate synchronous detecting apparatus according to claim 30, wherein the first portion comprises a detection area of an STS-3 frame, and the second portion comprises a detection area of an STS-12 frame.

35. The multiple frame rate synchronous detecting apparatus according to claim 30, wherein the first portion comprises a detection area of an STS-12 frame, and the second portion comprises a detection area of an STS-48 frame.

36. The multiple frame rate synchronous detecting apparatus according to claim 30, wherein the first portion comprises a detection area of an STS-3 frame, and the second portion comprises a detection area of an STS-48 frame.

* * * * *